United States Patent
Lee

(10) Patent No.: US 8,692,477 B1
(45) Date of Patent: Apr. 8, 2014

(54) METHOD AND CIRCUIT FOR DETECTING SHORT CIRCUIT IN AN ASYNCHRONOUS DC-DC BOOST CONVERTER

(71) Applicant: Gilbert S. Lee, Seoul (KR)

(72) Inventor: Gilbert S. Lee, Seoul (KR)

(73) Assignee: Alpha & Omega Semiconductor, Inc., Sunnyvale, CA (US)

( * ) Notice: Subject to any disclaimer, the term of this patent is extended or adjusted under 35 U.S.C. 154(b) by 0 days.

(21) Appl. No.: 13/756,978

(22) Filed: Feb. 1, 2013

(51) Int. Cl.
*H05B 41/16* (2006.01)

(52) U.S. Cl.
USPC ........ 315/247; 315/291; 315/185 S; 315/307; 315/312

(58) Field of Classification Search
USPC ................. 315/291, 185 S, 247, 307–326
See application file for complete search history.

(56) References Cited

U.S. PATENT DOCUMENTS

| 8,441,199 B2 * | 5/2013 | Santo et al. .................... 315/224 |
| 8,569,975 B2 * | 10/2013 | Uchimoto et al. ............ 315/307 |

* cited by examiner

*Primary Examiner* — Tuyet Thi Vo
(74) *Attorney, Agent, or Firm* — Chein-Hwa Tsao; CHEmily LLC

(57) ABSTRACT

A simple, cost-effective and efficient short circuit protection with simple routing of the ground on the PCB is achieved in an asynchronous DC-DC boost converter wherein a voltage sensing controller selectively isolates an input power supply to a load in the event of a short circuit. The controller alleviates need for additional components by utilizing the circuit for under voltage lockout protection and the circuit for overvoltage protection to generate signals for detecting short circuit. A predetermined offset voltage is added to a sensed output voltage to generate a reference voltage that is compared to a sensed input voltage and an output signal having a high state is generated in the event that the reference voltage is less than the sensed input voltage for selectively disabling the source of input power when the output signal is in the high state.

11 Claims, 3 Drawing Sheets

Figure 1:
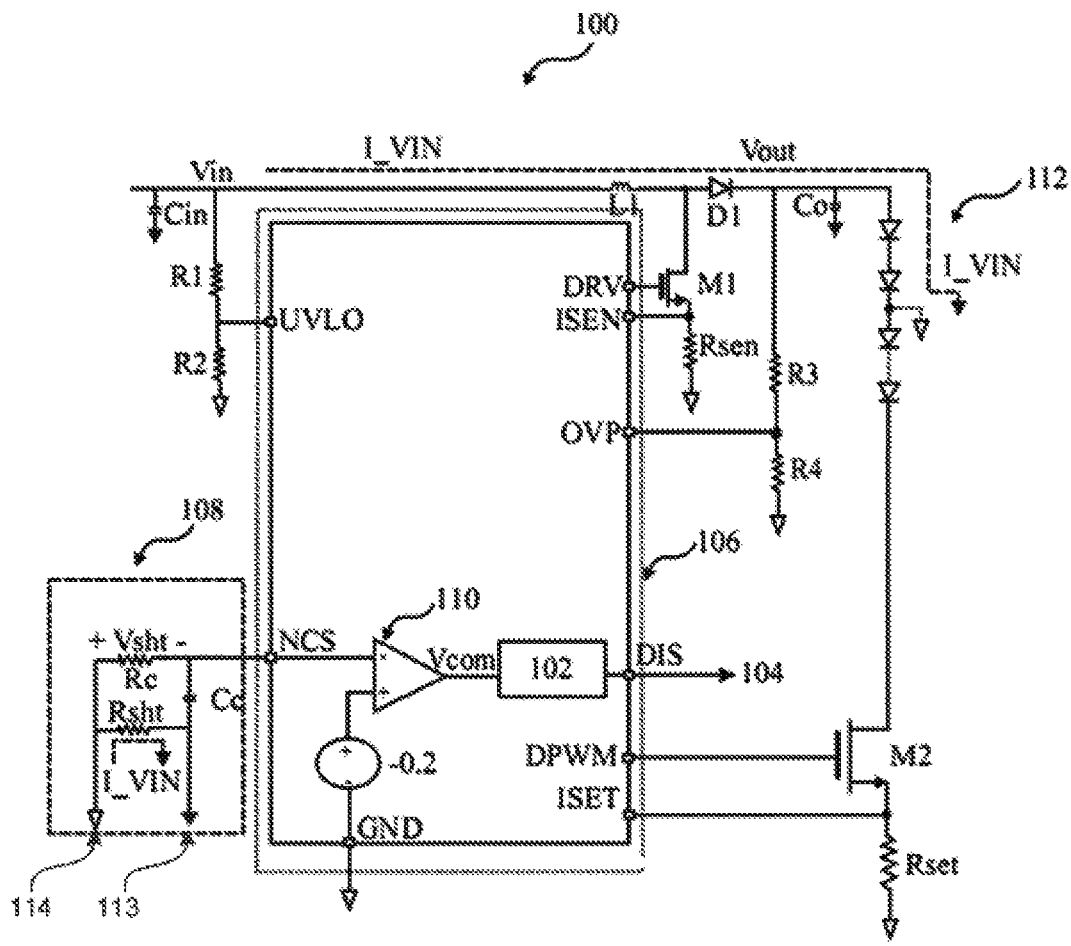

METHOD AND CIRCUIT FOR DETECTING SHORT CIRCUIT IN AN ASYNCHRONOUS DC-DC BOOST CONVERTER

FIELD

The present invention relates to detection of short circuit condition in an asynchronous DC-DC boost converter circuit and preventing burn-out of associated components.

DEFINITIONS

The expression 'load' used hereinafter in this specification refers to but is not limited to low power loads including Light Emitting Diodes (LED), light bulbs, backlights and the like.

The expression 'node' used hereinafter in this specification refers to but is not limited to a connection point or a redistribution point wherein at least two elements of a circuit meet.

The expression 'short circuit' or 'short' used hereinafter in this specification refers to but is not limited to a phenomenon wherein a node is connected into another node electrically.

The expression 'comparator' used hereinafter in this specification refers to comparators and operational amplifiers.

The expression 'under voltage lockout level' used hereinafter in this specification refers to but is not limited to a pre-determined operational voltage level.

These definitions are in addition to those expressed in the art.

BACKGROUND

Boost converters are generally employed to provide a stepped up voltage for driving connected loads. Most step-up DC-DC converters adopt asynchronous switches like diode or schottky diode as a switch because they don't need a driving circuit unlike other synchronous switches like BJT, MOSFET, IGBT, and the like. The configuration of an asynchronous DC-DC boost converter does not permit a cut-off of the power path from the input power supply to the output load. If the input power supply voltage is higher than the output voltage during a normal operation, a short circuit is envisaged and a huge current may flow from the input to the output through and inductor and an asynchronous switch comprising the DC-DC boost converter circuit. If the power path is not cut off, the high short current can burn out the inductor or the asynchronous switch. Therefore, a short circuit detection method is necessary and the short circuit signal should be conveyed to the input power supply controller or an isolation switch driver to cut off the power path.

An asynchronous DC-DC boost converter comprises a controller to control the functioning of circuit components besides detecting a short circuit condition and protecting circuit components from high short circuit current. The protection controller typically comprises a comparator that compares a sensing voltage generated by the current through the asynchronous DC-DC boost converter with a short circuit detection threshold voltage reference. The comparator compares both the voltage signals and accordingly provides a signal to a disabling means that is used to cut off the supply of input power to the load. This conventional converter includes a current sensing circuit typically comprising resistors and capacitors in a predetermined configuration for determining the current flowing through the load. Whenever, there is a short in the asynchronous DC-DC boost converter or in the load circuit, high current flows to the system ground through a predefined resistor and correspondingly a dropout voltage is generated. The dropout voltage is then provided as an input to the comparator for comparing with short circuit detection threshold voltage reference and accordingly the input power supply is disconnected from the asynchronous DC-DC boost converter. The controller thus ensures that the input power supply is cut off in the event of a short circuit.

The operation of the aforementioned controller is based on the short circuit current that is transferred to an input of the comparator. The short circuit resistor used for current sensing requires an additional filter circuit in parallel to remove undesired noise in the circuit. The short circuit resistor needs to have an optimum value to ensure accuracy and at the same time be enough to avoid high power loss, thus increasing the cost of controller circuit. The short circuit resistor needs to be precisely calibrated for sensing the short circuit current which makes its usage in the circuit expensive. Also, the power loss due to short circuit resistor cannot be neglected as it always consumes power during normal operation of the converter.

Therefore, there is a need for a better and efficient protection controller for asynchronous DC-DC boost converters which can precisely detect high short circuit current and protect the asynchronous DC-DC boost converters and the load from burn out.

SUMMARY

In accordance with an embodiment of the present disclosure, there is provided a voltage sensing controller for an asynchronous DC-DC boost converter, the controller adapted to selectively isolate an input power supply to a load, the controller comprising:

a circuit having a first node connected to the input power supply and a second node connected to the load;

a first voltage divider comprising a first pair of resistors adapted to be connected between the first node and ground and further adapted to generate a sensed input voltage;

a second voltage divider comprising a second pair of resistors adapted to be connected between the second node and ground and further adapted to generate a sensed output voltage;

an offset voltage generator adapted to receive the sensed input voltage and the sensed output voltage and determine an offset voltage between the sensed input voltage and the sensed output voltage;

a reference voltage generator adapted to add the offset voltage to the sensed output voltage and generate a reference voltage;

a comparator adapted to compare the sensed input voltage with the reference voltage and generate an output signal having a high state in the event that the reference voltage is less than the sensed input voltage and a low state in the event that the reference voltage is greater than the sensed input voltage; and disabling means adapted to receive the output signal and generate a disabling signal to selectively disable the source of input power when the output signal is in the high state.

In the event that there is a wide difference between the output voltage and the input voltage of a converter, an alternate embodiment as envisaged in the present disclosure further comprises a third voltage divider for providing only over voltage protection wherein the first and second voltage dividers provide short circuit protection.

In accordance with a preferred embodiment, values of the first pair of resistors and the second pair of resistors being selected such that ratio of values of the first pair of resistors equals ratio of values of the second pair of resistors. This enables easy determination of the offset voltage based on the input offset voltage of the comparator, voltage corresponding to a permissible short circuit current level and permissible drop in value of output voltage at the second node.

Typically, the disabling means includes a time delay circuit adapted to introduce a predetermined time delay before the disabling signal is generated.

In accordance with the present disclosure, the controller comprises at least one of discrete components, integrated circuits and hybrid integrated circuits.

The controller as described herein above typically finds application in LED backlight systems and lamp systems.

In accordance with the present disclosure, there is provided a method of selectively isolating an input power supply of an asynchronous DC-DC boost converter to a load, the method comprising the steps of:

connecting the input power supply to a first node;
connecting the load to a second node;
defining a permissible drop in the output voltage at the second node from the input voltage at the first node during normal operation and the voltage corresponding to a permissible short circuit current;
generating a sensed input voltage corresponding to the input power supply; generating a sensed output voltage corresponding to the output voltage at the second node;
receiving the sensed input voltage and the sensed output voltage;
determining an offset voltage between the sensed input voltage and the sensed output voltage based on the permissible dropout voltage between the input and the output, including the input offset voltage of the comparator;
adding the offset voltage and the sensed output voltage to generate a reference voltage;
comparing the sensed input voltage and the reference voltage and generating an output signal having a high state in the event that the reference output voltage is less than the sensed input voltage and a low state in the event that the reference output voltage is greater than the sensed input voltage; receiving the output signal; and
selectively disabling the input power supply when the output signal is in the high state.

Typically, the step of generating a sensed input voltage and generating a sensed output voltage, as described herein above, are preceded by the following steps:

selecting a first pair of resistors constituting a first voltage divider and a second pair of resistors constituting a second voltage divider, values of the first pair of resistors and the second pair of resistors being selected such that ratio of values of the first pair of resistors, which serves to set an input voltage for the under voltage lockout protection as well as a first sensed voltage as an input for the comparator equals ratio of values of the second pair of resistors, which serves to set the threshold voltage of the over voltage protection as well as a second sensed voltage as an input for the comparator;
connecting the first voltage divider between the first node and ground; and
connecting the second voltage divider between the second node and ground.

Typically, the step of comparing, as described herein above, is preceded by the steps of:

connecting the sensed input voltage to a non-inverting terminal of a comparator;
connecting the reference voltage to an inverting terminal of the comparator; and
adding the input offset voltage of the comparator to the offset voltage.

Typically, the step of selectively disabling the input power supply, as described herein above, is preceded by the step of providing a predetermined time delay.

OBJECTS

Some of the objects of the present disclosure aimed to ameliorate one or more problems of the prior art or to at least provide a useful alternative are described herein below:

An object of the present disclosure is to detect short circuit in an asynchronous DC-DC boost converter circuit.

Another object of the present disclosure is to protect components of an asynchronous DC-DC boost converter circuit from burn-out in case of a short circuit.

Yet another object of the present disclosure is to reduce power loss that occurs in conventional circuits employed for short circuit protection in an asynchronous DC-DC boost converter.

Still another object of the present disclosure is to provide a cost effective controller that serves to protect components during a short circuit in an asynchronous DC-DC boost converter.

An additional object of the present disclosure is to provide a simple controller that serves to protect components during a short circuit in an asynchronous DC-DC boost converter.

One more object of the present disclosure is to provide a controller, with improved efficiency, to protect components during a short circuit in an asynchronous DC-DC boost converter.

Still one more object of the present disclosure is to provide a controller that serves to protect components during a short circuit in an asynchronous DC-DC boost converter, the controller constituting relatively fewer components.

Other objects and advantages of the present disclosure will be more apparent from the following description when read in conjunction with the accompanying figures, which are not intended to limit the scope of the present disclosure.

BRIEF DESCRIPTION OF THE ACCOMPANYING DRAWINGS

Figure 2:
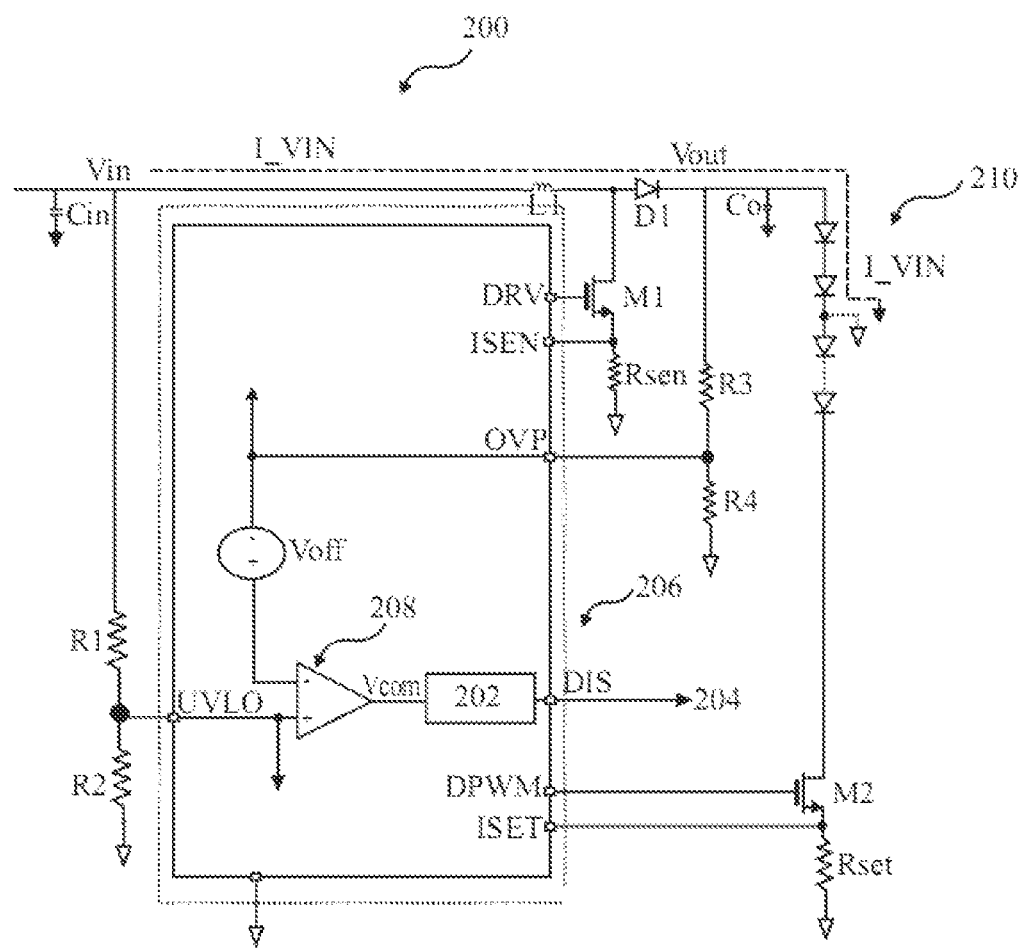
Figure 3:
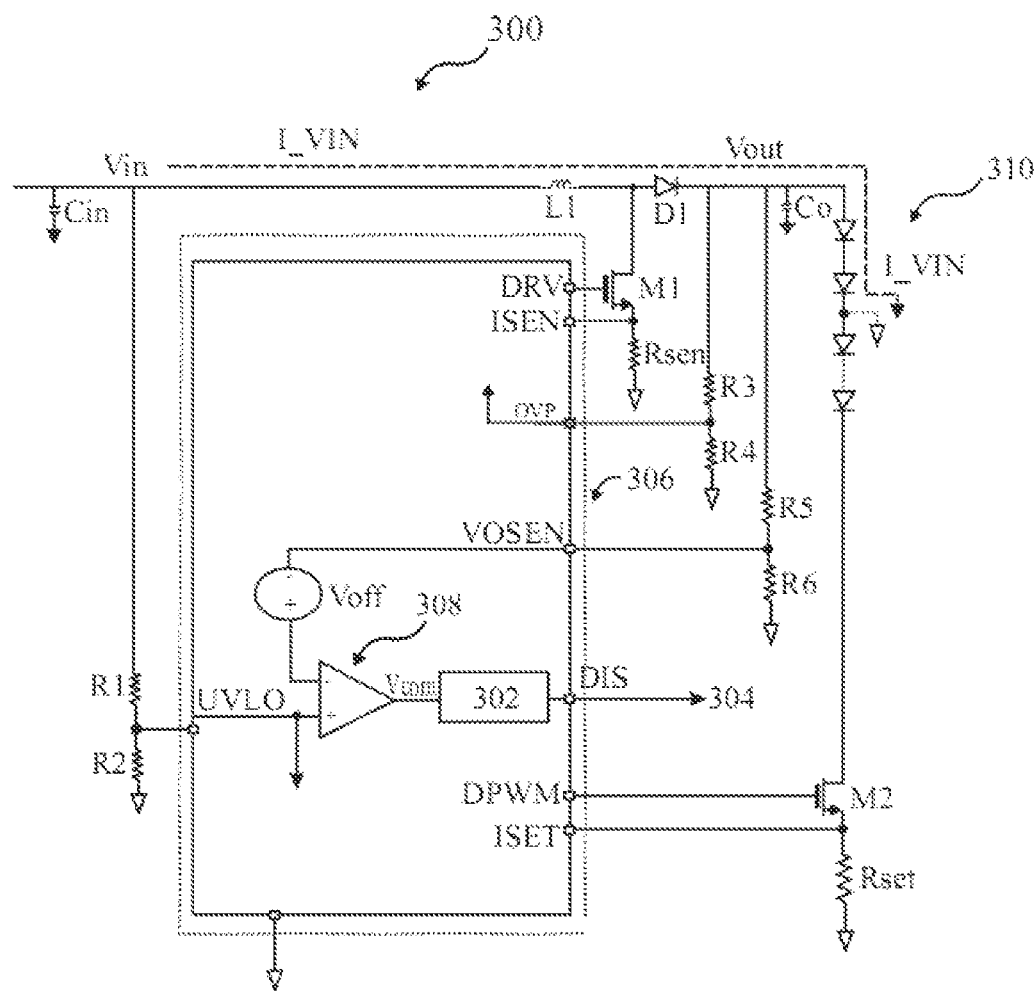

The present disclosure will now be described in relation to the accompanying drawings, in which:

FIG. 1 illustrates a conventional controller associated with an asynchronous DC-DC boost converter for an LED backlight system with a PWM dimming control including the conventional short circuit protection using a negative current sensing method;

FIG. 2 illustrates a controller in accordance with an embodiment of the present disclosure, associated with an asynchronous DC-DC boost converter for an LED backlight system with a PWM dimming control; and FIG. 3 illustrates a controller in accordance with another embodiment of the present disclosure, associated with an asynchronous DC-DC boost converter for an LED backlight system with a PWM dimming control.

Corresponding reference numerals/indicia indicate corresponding parts throughout the several views of the accompanying drawings.

DETAILED DESCRIPTION OF THE ACCOMPANYING DRAWINGS

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

FIG. 1 illustrates a conventional controller associated with an asynchronous DC-DC boost converter, described particularly with reference to an Integrated Circuit (IC) chip for an LED backlight system with a PWM dimming control including the conventional short circuit protection using a negative current sensing method. As illustrated in the figure, an asynchronous DC-DC boost converter (100) comprises a controller (106) connected to a current sensing circuit (108). The input voltage at a first node Vin is sensed through a voltage divider comprising resistors R1 and R2 and provided to the controller (106) at a pin UVLO. The pin UVLO along with the resistors R1 and R2 also serve to provide under voltage lock out protection. The output voltage at a second node Vout is sensed through a voltage divider comprising resistors R3 and R4 and provided to the controller (106) at a pin OVP. The sensed voltage at the pin OVP based on selected values of the resistors R3 and R4 serve to provide over voltage protection. The current from the first node Vin to the second node Vout flows through an inductor L1 and an asynchronous switch, typically a diode D1 and is further provided to a load (112), typically a series of LEDs. The current sensing circuit (108) comprises a short circuit resistor Rsht connected in parallel with resistor Rc and capacitor Cc, and is further connected to a pin NCS (Negative current sensing) of the controller (106). A protection circuit of the controller (106) includes a comparator (110) that compares the sensed dropout voltage from the current I_VIN in the current sensing circuit (108) with the short circuit detection threshold reference voltage (−0.2V) and generates an output signal Vcom, further provided to a disabling means that disables an input power supply through a disabling signal (104), which is provided through a delay circuit (102) for stable operation. The controller (106) also includes a pulse width modulator connected to a pin DPWM for LED current dimming control, in the application of a LED backlight driver. The current flowing through the load (112) is regulated by a current setting resistor Rset connected to a pin ISET of the controller (106). A switch M2 and the pin DPWM enable PWM dimming control based on external signals. In FIG. 1, there are two kinds of grounds, the system ground (113) which is connected to all grounds of a complex system, and the sash ground (114) which is connected to the sash enveloping the LED module and the ground of the controller IC (106). Both the grounds (113 and 114) are coupled though the current sensing circuit (108). When the short circuit happens in any point of the load (112) or LED string the short circuit current (I_VIN) flows from the input supply Vin to the system ground (113) through the inductor (L1), the asynchronous switch (D1), the shorted LEDs (112), the dimming control switch (M2) and the current sensing circuit (108).

During normal operation of the asynchronous DC-DC boost converter (100), the current flows from the input power supply, Vin, to the system ground (113) through the inductor (L1), the asynchronous switch (D1), the LED string (112), the dimming control switch (M2), the LED current setting resistor (Rset) and the current sensing circuit (108). In the event of short circuit to the IC ground through the output of the asynchronous DC-DC boost converter or any point of the LED string (112), a high current I_VIN flows through the load (112) as well as through other components of the circuit such as inductor (L1) and diode (D1) to the IC ground and subsequently the current I_VIN flows to the system ground as depicted in the current sensing circuit (108), through the short circuit resistor Rsht generating a dropout voltage Vsht. The dropout voltage Vsht makes the voltage level at the pin NCS to drop down below the IC ground with a magnitude proportional to the dropout voltage Vsht. As the magnitude of the dropout voltage Vsht increases beyond 0.2V, the NCS pin voltage applied at an inverting terminal of the comparator (110) decreases and reaches the short circuit detection threshold reference voltage by −0.2V applied at a non-inverting terminal of the comparator (110) and the output signal Vcom goes high thereby disabling the input power supply. In other words, the output of the comparator (110), Vcom goes high when the dropout voltage Vsht is greater than 0.2V and Vsht has an equation as below, $$Vsht = I_{VIN} * Rsht > 0.2$$

Thus, Vcom="high" implies DIS="high" and the input power supply is disconnected from the load (112) by the controller (106) by means of the disabling signal (104). The disabling signal (104) is configured to disable the input power supply directly or the driver of an isolation switch provided between the input power supply and the DC-DC converter as part of a disabling system.

To avoid noise during negative current sensing (NCS) in the current sensing circuit (108), the resistor Rc and capacitor Cc, that perform the operation of a low pass filter, are provided in parallel with the short circuit resistor Rsht. The short circuit resistor Rsht is expensive since its value is required to be small enough not to cause high power loss and accurate enough to sense the short circuit current with the low level of Vsht. The power loss due to the short circuit resistor Rsht is not negligible because it always consumes power during normal operation, thus increasing the overall cost of the converter using the negative current sensing (NCS) method known in the art.

However, in case of low voltage loads such as LED backlight systems, LED lamp systems and the like, there is felt a need for an efficient system that reduces power loss and protects the load from high short circuit current without compromising the efficiency because power loss is more important in a low power system.

FIG. 2 illustrates a controller associated with an asynchronous DC-DC boost converter in accordance with an embodiment of the present disclosure. The controller is described particularly with reference to an Integrated Circuit (IC) chip for an LED backlight system with a PWM dimming control. However, implementation of the circuit of the present disclosure using discrete components or hybrid integrated circuits is considered within the scope of the present disclosure. As illustrated in the figure, a boost converter (200) comprises a controller (206) for timely detection of short circuit and isolation of the input power supply from the load (210), typically an LED string. The current flowing through the load (210) is regulated by a resistor Rset connected at a pin ISET. The controller (206) also includes a pulse width modulator controlled by a pin DPWM for the LED dimming control in the application of a LED backlight driver. A switch M2 and the pin DPWM enable PWM dimming control based on external signals.

A sensed input voltage is provided by a first voltage divider comprising resistors R1 and R2 connected to a pin UVLO by sensing the input power received at a first node Vin. A sensed output voltage is provided by a second voltage divider comprising resistors R3 and R4 connected to a pin OVP by sensing the voltage at a second node Vout. The controller (206) comprises a comparator (208) for comparing the sensed input voltage with the sensed output voltage. For computational ease, values of the resistors comprising resistor pair (R1 and R2) and the resistor pair (R3 and R4) respectively are selected such that their ratios are equal. The ratio of values of the first resistor pair (R1 and R2) serves as a threshold voltage of the under voltage lockout (UVLO) protection as well as the sensed input voltage for the comparator (208) and the ratio of values of the second resistor pair (R3 and R4) serves as a threshold voltage of the over voltage protection (OVP) as well as the sensed output voltage of the comparator (208). The comparator (208) compares the sensed voltages at the pins OVP and UVLO and generates an output signal Vcom. The output signal Vcom of the comparator (208) is provided at the DIS pin to a disabling means via a delay circuit (202) that accordingly disables the input power supply.

When the input power is applied to the asynchronous DC-DC boost converter, the minimum output voltage at the second node Vout is represented by the equation:

$$V_{out} = V_{in} - VF$$

wherein, VF is the forward voltage of diode D1, an asynchronous switch. The above equation is applicable when the asynchronous DC-DC boost converter is disabled or zero on-duty. During normal operation, however, Vout is always higher than Vin because the output of the step-up DC-DC converter can never be lower than the input. In the event of a short circuit at the node Vout or at any point of the LED string (210), a high short circuit current I_VIN flows through the load (210) and other components such as inductor L1, diode D1, shorted LED string (210) and PWM dimming switch M2. To prevent further feeding into this high short circuit current I_VIN, the input power supply is disconnected from the asynchronous DC-DC boost converter (200) by a disabling signal (204). To generate the disabling signal for achieving isolation of the load (210) from the input power supply, the controller of the present invention utilizes the fact that when there is a short circuit in the asynchronous DC-DC boost converter (200), the level of voltage at the second node Vout drops abruptly below the level of voltage at the first node Vin. The sensed output voltage and the sensed input voltage are provided to a comparator with an offset voltage Voff based on the input offset voltage of the comparator (208), a permissible drop in value of voltage at the second node Vout and voltage corresponding to a permissible short circuit current level. A voltage difference between the sensed input voltage and the sensed output voltage is predetermined, by an offset voltage generator and is applied to one of the inputs of the comparator (208) for stable short circuit protection. A reference voltage generator provides a sum of the sensed output voltage (at the OVP pin) and the offset voltage Voff as a reference voltage to an inverting terminal of the comparator (208). The comparator (208) compares the voltage signals at its input terminals and generates an output signal Vcom having a high state in the event that the reference voltage is less than the sensed input voltage and a low state in the event that the reference voltage is greater than the sensed input voltage.

When the output signal Vcom corresponds to a high state, the sum of the forward voltage (VF) of the asynchronous switch D1 and voltage at the second node Vout is lower than the voltage at the first node Vin. Accordingly, the voltage at the pin UVLO is higher than the sum of the offset voltage (Voff) and the voltage at the pin OVP and then the comparator output Vcom goes into a high state as expressed by the below equation where R1=R3 and R2=R4:

$$Vin - Vout > Voff * \left(1 + \frac{R1}{R2}\right)$$

The output signal Vcom of the comparator (208) is provided to the disabling means, typically including a delay circuit (202) that provides a pre-calculated precise amount of time delay before disabling the input power supply by the disabling signal (204). The delay circuit (102) is intended to provide stable operation by alleviating problems associated with noise by introducing at least one method including deglitch circuits, filter circuits, time delay circuits and the like. The system of the present disclosure as illustrated in FIG. 2 does not require additional components to realize short circuit protection elements like the additional resistor pair in the conventional circuit of FIG. 1 because the UVLO and OVP functions that are already provided are also used for the short circuit protection. In addition, there is no extra power loss through the negative current sensing circuit of the conventional protection method illustrated in FIG. 1. Since there is only one common ground, it gives an additional advantage of better performance and convenience in the ground routing of the printed circuit board (PCB).

FIG. 3 illustrates a controller associated with an asynchronous DC-DC boost converter in accordance with another embodiment of the present disclosure. This embodiment particularly caters to short circuit protection for an asynchronous DC-DC boost converter for an LED backlight system with a PWM dimming control, particularly having a high Vout/Vin ratio. The controller is described particularly with reference to an Integrated Circuit (IC) chip. However, implementation of the circuit of the present disclosure using discrete components or hybrid integrated circuits is considered within the scope of the present disclosure. As illustrated in the figure, an asynchronous DC-DC boost converter (300) comprises a controller (306) protecting components and a load (310) from high short circuit current I_VIN by isolating the converter (300) or the load (310) connected at a second node Vout from the input power supply at a first node Vin. The controller (306) comprises a comparator (308) for comparing a sensed input voltage and a sensed output voltage. The sensed input voltage is provided by a first voltage divider comprising resistors R1 and R2 connected to a pin UVLO. The sensed output voltage is provided by a second voltage divider comprising resistors R5 and R6 connected to a pin VOSEN. For computational ease, values of the resistors comprising resistor pair (R1 and R2) and the resistor pair (R5 and R6) are selected such that their ratios are equal. The ratio of values of the first resistor pair (R1 and R2) serves as a threshold voltage of the under voltage lockout (UVLO) protection as well as the sensed input voltage for the comparator (308) and the ratio of values of the second resistor pair (R5 and R6) serves as the sensed output voltage of the comparator (308). A third voltage divider comprising resistors R3 and R4 is connected to a pin OVP having a resistance ratio based on a predetermined over voltage protection threshold value for the output over voltage protection. The comparator (308) compares the sum of the predetermined offset voltage (Voff) and the sensed voltages at the pin VOSEN with the sensed voltage at the pin UVLO and generates an output signal Vcom. The current flowing through the load (310) is regulated by a resistor Rset connected at a pin ISET. A switch M2 and the pin DPWM enable PWM dimming control based on external signals.

When the ratio of the sensed output voltage to the sensed input voltage is high, the voltage divider connected to the pin OVP is not used for the dual purposes of over-voltage protection and for generating the sensed output voltage as in the case of the asynchronous DC-DC boost converter IC of FIG. 2. In such a condition, the threshold value for over voltage protection cannot be fixed due to the variable level of voltage at the second node Vout that depends on the needed operating voltage or the number of loads connected serially like the LED load or lamp load for backlight system and accordingly the current drawn by the load (310). Therefore the values of resistors comprising resistor pair (R3 and R4) are different from the values of resistors comprising resistor pair (R1 and R2); the resistor pair (R3 and R4) being specifically selected to cater to over voltage protection. Therefore when Vout/Vin ratio is high, the third voltage divider (R3 and R4) connected to the pin OVP is provided for over voltage protection only and the second voltage divider (R5 and R6) connected to the pin VOSEN is provided for generating the sensed output voltage only.

In the event of a short circuit, the level of voltage at the second node Vout drops abruptly below the level of voltage at the first node Vin and a high short circuit current I_VIN flows through the load (310) and other components such as inductor L1 diode D1 and shorted load like LED strings. The sensed input voltage and the sensed output voltage are provided to a comparator with an offset voltage Voff based on the input offset voltage of the comparator (308), a permissible drop in value of voltage at the second node Vout and voltage corresponding to a permissible short circuit current level. A voltage difference between the sensed input voltage and the sensed output voltage is predetermined, by an offset voltage generator, and is applied to one of the inputs of the comparator (208) for stable short circuit protection. A reference voltage generator provides a sum of the sensed output voltage (at the VOSEN pin) and the offset voltage Voff as a reference voltage to an inverting terminal of the comparator (308). The comparator (308) compares the voltage signals at its input terminals and generates an output signal Vcom having a high state in the event that the reference voltage is less than the sensed input voltage and a low state in the event that the reference voltage is greater than the sensed input voltage. The expression for the offset voltage when the pin DIS is provided with a disable signal, is as given herein below:

$$Vin\frac{R2}{R1+R2} - Vout\frac{R5}{R5+R6} > Voff$$

and $$Vin - Vout > Voff * \left(1 + \frac{R1}{R2}\right), \text{ where } R1 = R5 \text{ and } R2 = R6$$

The output signal Vcom of the comparator (308) is provided to the disabling means, typically including a delay circuit (302) that provides a pre-calculated precise amount of time delay before disabling the input power supply from the converter or the load through the disabling signal (304).

The controller in accordance with FIGS. 2 and 3 of the present disclosure thus averts the need for additional components as known in the prior art, for detection of short circuit condition and generating a signal to isolate the input power supply from the load and thereby reducing power loss in the system and consequently reducing the cost and increasing the efficiency of the system.

The circuits of FIG. 2 and FIG. 3 of the present disclosure result in simpler routing of the ground on the IC, the performance is enhanced and the system is more cost-effective because of a common ground when compared with the conventional circuit of FIG. 1 wherein a separate system ground and a sash ground is required. Some of the objects of the present disclosure aimed to ameliorate one or more problems of the prior art or to at least provide a useful alternative are described herein below:

An object of the present disclosure is to detect short circuit in an asynchronous DC-DC boost converter circuit.

Another object of the present disclosure is to protect components of an asynchronous DC-DC boost converter circuit from burn-out in case of a short circuit.

Yet another object of the present disclosure is to reduce power loss that occurs in conventional circuits employed for short circuit protection in an asynchronous DC-DC boost converter.

Still another object of the present disclosure is to provide a cost effective controller that serves to protect components during a short circuit in an asynchronous DC-DC boost converter.

An additional object of the present disclosure is to provide a simple controller without additional circuit for a short circuit detection that serves to protect components during a short circuit in an asynchronous DC-DC boost converter, the controller constituting relatively fewer components.

One more object of the present disclosure is to provide a controller, with improved efficiency, to protect components during a short circuit in an asynchronous DC-DC boost converter.

Still one more object of the present disclosure is to provide a controller without splitting grounds on PCB layout that serves to protect components during a short circuit in an asynchronous DC-DC boost converter.

The controller as described herein above typically finds application in LED backlight systems and lamp systems.

Technical Advancements and Economic Significance

The technical advancements offered by the present disclosure include the realization of:

a controller that detects short circuit in an asynchronous DC-DC boost converter circuit;

a controller that ensures protection of components of an asynchronous DC-DC boost converter circuit from burn-out in case of a short circuit;

a controller that reduces power loss that occurs in conventional circuits employed for short circuit protection in an asynchronous DC-DC boost converter;

a cost effective controller that serves to protect components during a short circuit in an asynchronous DC-DC boost converter;

a simple controller without additional circuit for a short circuit detection that serves to protect components during a short circuit in an asynchronous DC-DC boost converter, the controller constituting relatively fewer components;

an efficient controller, with improved efficiency, to protect components during a short circuit in an asynchronous DC-DC boost converter; and a simple layout having a single ground without splitting grounds in the printed circuit board (PCB) for a short circuit protection circuit in a controller of an asynchronous DC-DC boost converter.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

Wherever a range of values is specified, a value up to 10% below and above the lowest and highest numerical value respectively, of the specified range, is included in the scope of the disclosure.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specifically to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A voltage sensing controller for an asynchronous DC-DC boost converter, said controller adapted to generate a signal to selectively isolate an input power supply to a load, said controller comprising:
    a circuit having a first node connected to the input power supply and a second node connected to the load;
    a first voltage divider comprising a first pair of resistors adapted to be connected between said first node and ground and further adapted to generate a sensed input voltage;
    a second voltage divider comprising a second pair of resistors adapted to be connected between said second node and ground and further adapted to generate a sensed output voltage;
    an offset voltage generator adapted to receive said sensed input voltage and said sensed output voltage and determine an offset voltage between said sensed input voltage and said sensed output voltage;
    a reference voltage generator adapted to add said offset voltage to said sensed output voltage and generate a reference voltage;
    a comparator adapted to compare said sensed input voltage with said reference voltage and generate an output signal having a high state in the event that said reference voltage is less than said sensed input voltage and a low state in the event that said reference voltage is greater than said sensed input voltage; and
    disabling means adapted to receive said output signal of said comparator and generate a disabling signal to selectively disable said source of input power when said output signal is in said high state.

2. The controller as claimed in claim 1, further comprising a third voltage divider adapted to have a divider ratio based on a predetermined over voltage protection threshold value.

3. The controller as claimed in claim 1, wherein said offset voltage includes the input offset voltage of said comparator, voltage corresponding to a permissible short circuit current level and permissible drop in value of output voltage at said second node.

4. The controller as claimed in claim 1, wherein said disabling means includes a time delay circuit adapted to introduce a predetermined time delay before said disabling signal is generated.

5. The controller as claimed in claim 1, wherein said controller comprises at least one of discrete components, integrated circuits and hybrid integrated circuits.

6. An LED backlight system including the controller as claimed in claim 1.

7. A lamp system including the controller as claimed in claim 1.

8. A method of selectively isolating an input power supply of an asynchronous DC-DC boost converter to a load, said method comprising the steps of:
    connecting the input power supply to a first node;
    connecting the load to a second node;
    defining the permissible drop in the output voltage at the second node from the input voltage at the first node during normal operation and the permissible voltage corresponding to a short circuit current;
    generating a sensed input voltage corresponding to the input power supply;
    generating a sensed output voltage corresponding to the output voltage at the second node;
    receiving said sensed input voltage and said sensed output voltage;
    determining an offset voltage between said sensed input voltage and said sensed output voltage based on said permissible drop and said permissible voltage;
    adding said offset voltage and said sensed output voltage to generate a reference voltage;
    comparing said sensed input voltage and said reference voltage and generating an output signal having a high state in the event that said reference output voltage is less than said sensed input voltage and a low state in the event that said reference output voltage is greater than said sensed input voltage;

receiving said output signal; and selectively disabling said input power supply when said output signal is in said high state.

9. The method as claimed in claim 8, wherein the steps of generating a sensed input voltage and generating a sensed output voltage are preceded by the following steps:

selecting a first pair of resistors constituting a first voltage divider and a second pair of resistors constituting a second voltage divider;

connecting said first voltage divider between said first node and ground; and connecting said second voltage divider between said second node and ground.

10. The method as claimed in claim 8, wherein the step of comparing is preceded by the steps of:

connecting said sensed input voltage to a non-inverting terminal of a comparator;

connecting said reference voltage to an inverting terminal of said comparator; and adding the input offset voltage of said comparator to said offset voltage.

11. The method as claimed in claim 8, wherein said step of selectively disabling the input power supply is preceded by the step of providing a predetermined time delay.

* * * * *